INVENTOR.
Cecil Buchner
BY
Albert J. Taylor
ATTORNEY.

INVENTOR.
Cecil Buchner
BY Albert J. Taylor
ATTORNEY.

Patented Apr. 2, 1940

2,195,479

UNITED STATES PATENT OFFICE 2,195,479

VEHICLE TRANSMISSION

Cecil Buchner, Detroit, Mich., assignor, by mesne assignments, to Alma Motor Company, Dover, Del., a corporation of Delaware Application April 6, 1938, Serial No. 200,483

9 Claims. (Cl. 74—326)

This invention relates to the transmission of motive power from the motor to the wheels of an automotive vehicle and particularly concerns a motor, transmission and axle assemblage wherein the motor of the vehicle is disposed over an axle which it drives. The invention provides for a front wheel drive, wherein dirigible wheels on the front axle of the vehicle constitute the sole tractive propelling means, it provides a four wheel drive wherein all four wheels including the dirigible or steering wheels are driven, and it provides for driving the rear wheels of a vehicle in an arrangement wherein the motor is disposed directly over the rear axle.

According to common practice, the automotive vehicle transmission which provides for changing the driving torque to suit varying conditions of operation, and requirements for different speeds, is mounted directly upon the motor, or upon the clutch housing of the motor of the vehicle, and receives power from the motor shaft through a suitable clutch. Obviously, with the motor disposed over the axle to be driven, the power output shaft of the motor extends in a direction away from the axle to be driven, and any drive means extending between the power output shaft of the motor and the axle must include universal joints, as well as gearing and shafting for conveying power in the direction of the axle to be driven. The primary object of this invention is to provide the necessary change speed transmission, gearing, shafting and universal joints in an assemblage wherein wear conditions favor long useful life, especially with regard to the universal joints, the assemblage being characterized by the disposition of the universal joints whereby they have a normal angularity of zero.

The transmission, according to the present invention, is similar to conventional automotive vehicle transmissions in the respect that it provides change speed gearing. It is different from a conventional transmission, however, in that it provides a power output shaft disposed with its axis at an angle to the power output shaft of the motor, in a plane lower than the motor, and having a power take-off member extending in the direction from which the power is derived. With the vehicle motor disposed at an angle to the horizontal, the angularity of the power output shaft is made such that its axis coincides with the axis of the power receiving member in the axle assembly. The power output member of the transmission is connected to the power receiving member of the axle by shafting which includes one or more universal joints, and the purpose of the arrangement above described is to dispose the universal joint or joints whereby they have a normal angularity of zero.

Another object of the invention is to provide a transmission of the character above referred to and including, in addition to the angularly disposed power output member, a power output member in axial alignment with the power output member of the motor, and adapted to be connected by shafting and universal joints to another axle of a vehicle. In this respect the invention provides two oppositely directed power output members which are adapted to be coupled to the front and rear axles of a vehicle. As above pointed out, the power output member for the front axle is in co-axial alignment with the power receiving member in the front axle, and with the transmission inclined with respect to the horizontal due to its attachment to the inclined motor, the rear axle power output member is in axial alignment with the power receiving member in the rear axle. Thus the universal joint in the rear axle propeller shaft is disposed whereby its normal angularity is zero.

Another object of the invention is to provide a change speed transmission including a power output member adapted to deliver torque in the general direction from which the power is received. To this end a transmission is provided which includes a countershaft and constantly meshing gearing between the countershaft and the power input member, whereby the countershaft is constantly rotated. Upon the countershaft are a plurality of gears adapted to drive gears on the main shaft of the transmission, to provide for selective speed changes. In addition to these gears, which are common to most change speed transmissions, a pair of gears are mounted on the countershaft to rotate relative thereto, one of these gears being a bevelled gear and the other being a spur or helical gear which constantly meshes with a gear on the main shaft, the latter gear being fixed to the main shaft. A power output shaft is rotatably supported with its axis extending at an angle to the main shaft and countershaft, in the general direction of the power input member, and has a bevelled gear fixed thereon and meshing with the aforementioned bevelled gear on the countershaft.

With the above objects in view, and others which will become apparent from the detailed description which follows, the invention is more fully disclosed with reference to the accompanying drawings, in which Fig. 1 is a vertical section of the transmission;

Like characters of reference are employed throughout to designate corresponding parts.

Figure 1:
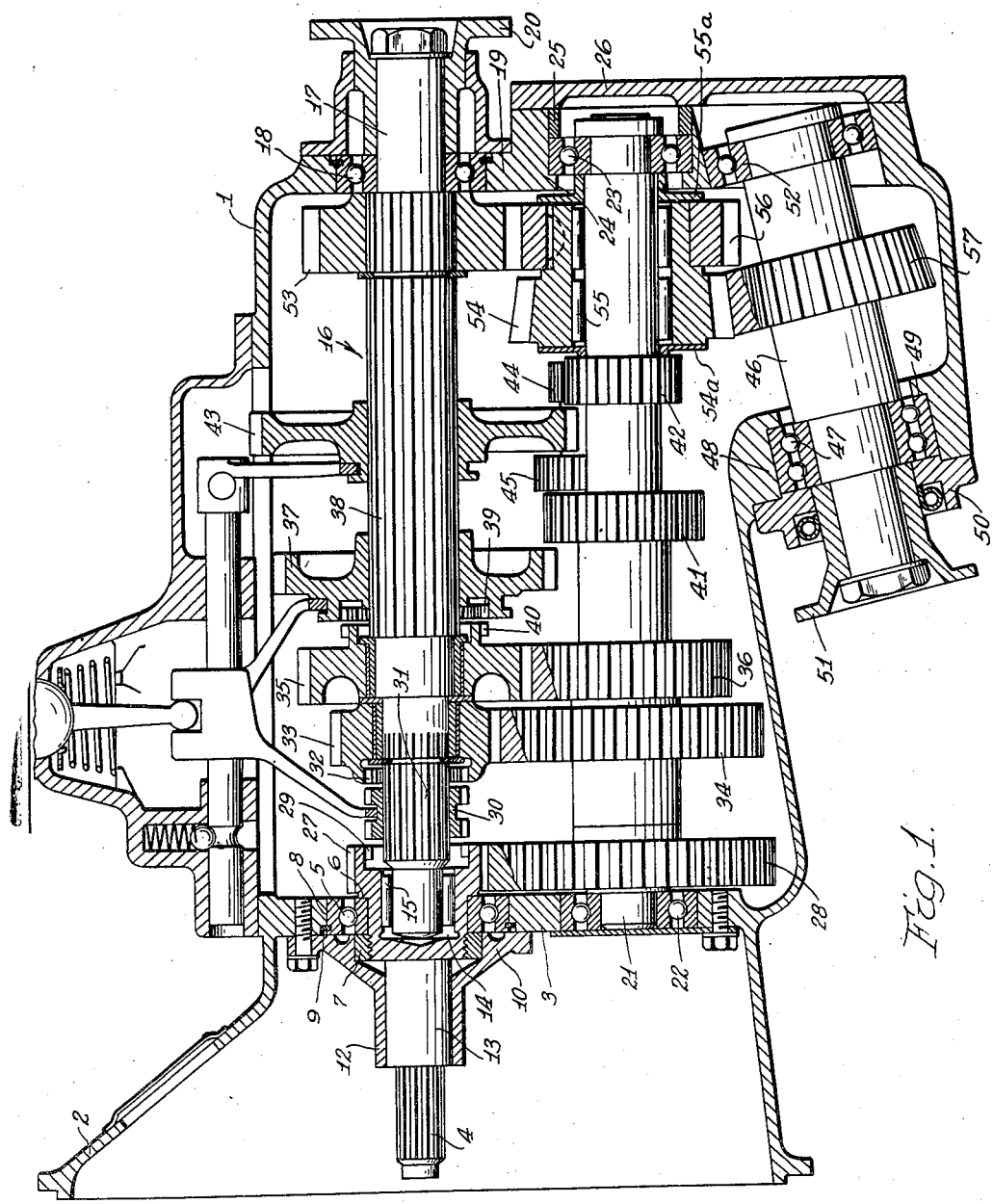

The transmission includes a housing 1 having a bell-end 2 adapted to be attached to the clutch housing or motor structure of an automotive vehicle in the usual manner. The bell-end 2 usually constitutes a part of the clutch housing. Adjacent to the bell-end 2 the housing is provided with a vertical dividing wall 3 which constitutes, as will hereinafter appear, means for supporting bearings for shafts in the transmission, as well as means for preventing lubricant contained in the transmission housing from entering the clutch housing.

The member which is driven by the motor through a clutch (not shown) has a splined end 4, adapted to be connected to the clutch mechanism, and a combined radial and end-thrust bearing 5 is secured thereon between a shoulder 6 and a screwthreaded ring 7. The bearing 5 is mounted in a bore 8 in the vertical wall 3, and is prevented from moving inwardly of the wall 3 by a snap ring 9. A plate 10 is secured to the wall 3 and retains the bearing 5 against outward movement, the plate 10 also having an axially extended bearing portion 12 providing additional support for the member driven by the motor, and which is hereinafter termed the power input member and generally designated 13.

The power input member 13 has an axial bore 14 in its inner end receiving and supporting roller bearings 15, in the plane of the bearing 5, which rotatably support the end of the main shaft 16, and maintain it in co-axial alignment with the power input member 13. The other end 17 of the shaft 16 is supported in a bearing 18 received in a bore in the end wall 19, and has a power take-off member 20 keyed thereto. In the case of a four wheel drive vehicle, the power take-off member 20 is connected to the rear axle by a propeller shaft, whereas in the case of a front wheel drive or a rear motor mounting the member 20 is dispensed with and a suitable dust seal provided for the bore which receives the bearing 18.

A countershaft 21 has one end mounted in a bearing 22 in the dividing wall 3, the other end of the countershaft having a combined radial and end-thrust bearing 23 secured thereon and locked in a bore in the end wall 19, between a shoulder 24 and a ring 25, the latter being held in place by a cover plate 26. It will be understood, although not here illustrated, that the cover plate 26 is secured by bolts or like securing elements to the end wall 19 of the transmission housing.

The power input member 13 has external tooth formations 27 thereon constantly meshing with a gear 28 secured to the countershaft, and the countershaft is, therefore, constantly driven. The power input member 13 also has internal tooth formations 29 adapted to be engaged by a slidable clutch element 30 on the splined portion 31 of the main shaft, to establish a direct drive between the power input member 13 and the main shaft 16. The clutch element 30 is also adapted to engage the internal teeth 32 on a gear 33 which meshes with a gear 34 secured on the countershaft. When the clutch element 30 is moved into engagement with the teeth 32 of the gear 33, the main shaft 16 is driven from the power input member 13 through the gears 28, 34 and 33.

A gear 35 is rotatably mounted on the main shaft 16 and constantly meshes with a gear 36 secured to the countershaft. A gear 37 is slidably mounted on the splined portion 38 and has internal teeth formations 39 at one side thereof adapted to engage the external teeth 40 on the gear 37, to establish a driving connection between the gear 37 and the main shaft 16. The gear 36 is of smaller diameter than the gear 34, and when the gear 37 is connected to the main shaft, the main shaft is driven at lower speed and higher torque.

The gear 37 may also be moved in a direction to engage a gear 41 on the countershaft, the gear 41 being of smaller diameter than the gear 36, whereby the drive established is at a still lower speed and correspondingly increased torque. A gear 42, smaller than the gear 41, is secured upon the countershaft and is adapted to be engaged by a sliding gear 43 on the main shaft to establish a still lower speed connection.

The transmission above described is capable of delivering torque to the main shaft 16 at five different ratios. The reverse drive is provided through idler gearing and comprises a gear 44, rotatably supported upon a shaft which is disposed in a vertical plane behind the plane of the countershaft, as shown in Fig. 1. Connected to the gear 44 to rotate therewith is a gear 45, and with the sliding gear 43 may be moved in the left hand direction from the position shown to mesh with the gear 45. When so meshed the main shaft is rotated in the reverse direction, as compared to the direction of rotation provided by the above described gears.

Mounted in the lower portion of the transmission housing is a power output shaft 46, supported at one end by a combined radial and end-thrust bearing 47, locked in a bore in a depending wall 48 against a shoulder 49 by a plate 50. A power take-off member 51, adapted to have a propeller shaft connected thereto, is keyed upon the outer end of the power output member 46, and the inner end of the power output member 46 is supported in a bearing 52 in the housing wall 19.

Upon the splined portion 38 of the main shaft is secured a gear 53 for driving one of a cluster of gears rotatably supported upon the countershaft. The cluster of gears is composed of a bevelled gear 54 having an elongate stem portion supported by antifriction bearings 55 on the countershaft, and a gear 56 keyed to the stem portion of bevelled gear and constantly meshing with the gear 53. The bevelled gear 54 constantly meshes with a bevelled gear 57 on the power output member 46.

Through meshing with the bevelled gear 54 the bevelled gear 54 becomes subject to end thrusts in the transmission of torque, and must, of course, be retained against endwise movement relative to the countershaft. To so retain the bevelled gear 54 it is placed between two washers 54a and 55a, the washer 54a having an axial stem engaging the gear 42 which is rigid on the countershaft, and the other washer 55a having an axial stem engaging the bearing 23 which is retained on the countershaft as above described.

From the foregoing it becomes apparent that the main shaft 16, with its power take-off member 20, and the power output member 46 with its power take-off member 51, may be caused to rotate at various speeds, with the power input member 13 rotating at a constant speed, or their direction of rotation may be reversed if desired. When the unit is used in conjunction with a four wheel drive vehicle, power is supplied to the rear axle by the power take-off member 20, and to the front axle by the power take-off member 51. This arrangement is illustrated in Fig. 2.

Figure 2:
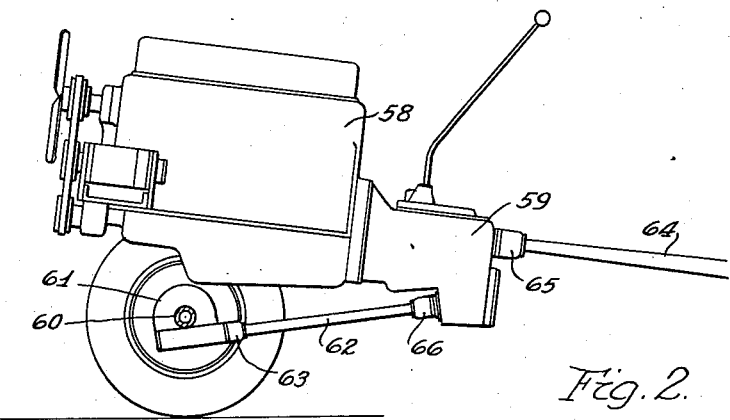
Fig. 2 is a fragmental elevation illustrating a four wheel drive assembly.

Referring to Fig. 2, the vehicle motor is designated 58 and a transmission constructed as above described and generally designated 59 is secured to one end thereof. The engine is mounted over the front axle 60, which may be of any suitable type having dirigible wheels and means for rotating the same. Such axles include a differential, contained in a housing 61, and a propeller shaft 62 is connected to the power receiving member by a universal joint 63. The other end of the propeller shaft 62 is connected to the power output member 46 by a universal joint 66. The rear wheels of the vehicle (not shown) are propelled through the usual axle construction by a propeller shaft 64, connected to the main shaft 16 by a universal joint 65.

No attempt has been made to illustrate the universal joints or the axle and wheel structures, because such structures are already well known in the art. The universal joints are, of course, of the constant velocity type, and an important feature of the invention is in providing most favorable conditions of operation for the universal joints. It will be understood that the propeller shaft designated 64 is intended to represent the usual construction, which includes a torque tube enclosing the propeller shaft proper and opposing torque reactions set up by wheel traction.

Upon reference to Fig. 2 it will be observed that the motor is tilted downwardly toward the rear of the vehicle. This permits the propeller shaft 64 to be axially aligned with both the main shaft and the power input shaft under normal conditions. The result is that the normal angularity of the universal joint 65 is zero, and obviously this is a very desirable condition.

With the power output member 46 of the transmission disposed at an angle to the power input member, as is shown in Fig. 6, the propeller shaft 62 is connected to the power output member by a universal joint 66, and the angularity of the universal joints 63 and 66 is zero under normal conditions.

Figure 3:
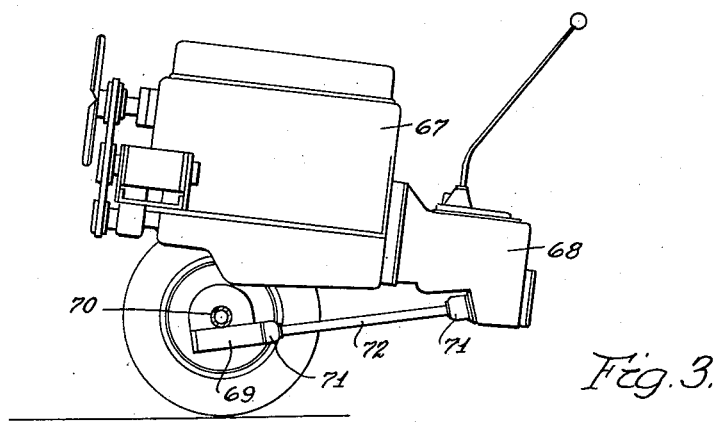
Fig. 3 is an elevation illustrating a front wheel drive arrangement.

Fig. 3 illustrates the applicability of the present invention to a vehicle wherein the front wheels alone are driven. In this arrangement the engine 67 is tilted rearwardly and the transmission housing 68, in being tilted therewith, disposes the power output member 46 in axial alignment with the power receiving member 69 in the axle 70. The universal joints in the propeller shaft 72 therefore have a normal position where their angularity is zero.

Figure 4:
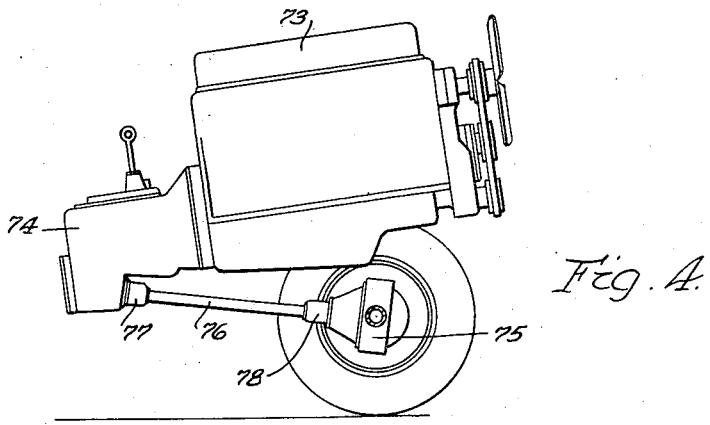
Fig. 4 is an elevation illustrating the engine disposed over a rear axle.

Fig. 4 illustrates an arrangement wherein the motor is mounted over a conventional rear axle. The motor is designated 73, and as in the case of a front motor mounting, it is inclined whereby the axis of the power output of the transmission 74 is coincident with the axis of the power receiving member in the differential 75. The propeller shaft 76 is connected to the transmission output by a universal joint 77 and is shown as connected to the differential 75 by a universal joint 78. It will be understood, however, that the universal joint 78 will be dispensed with in the absence of other means for resisting turning moments in the axle housing resulting from driving torque and braking reactions.

Although specific embodiments of the invention have been illustrated and described, it will be understood that various changes may be made within the scope of the appended claims without departing from the spirit of the invention, and such changes are contemplated.

What I claim is:

1. In a change speed transmission, a power input member, a main shaft co-axial with said input member, a countershaft geared to said input member, selectively operable intermeshing members on said main and countershafts for driving the main shaft at different speeds, a power take-off on said main shaft, a power output shaft having a power take-off extending in the direction of the power input member, a gear rotatable with the main shaft, a gear rotatably mounted on said countershaft and meshing with said gear, a third gear connected to the second gear, and a fourth gear secured upon the power output shaft and meshing with the third gear.

2. In a change speed transmission, a power input member, a main shaft co-axial with said input member, a countershaft geared to said input member, selectively operable intermeshing members on said main and countershafts for driving the main shaft from the countershaft at different speeds, a power output shaft disposed with its axis at an angle to the main shaft and having a power take-off extending in the direction of the power input, a bevelled gear rotatably mounted on said countershaft, a bevelled gear secured upon the power output shaft and meshing with the first bevelled gear, and means for driving the first bevelled gear from said main shaft.

3. In a change speed transmission, a power input number, a main shaft co-axial with said input member, a countershaft geared to said input member, selectively operable intermeshing members on said main and countershafts for driving the main shaft from the countershaft at different speeds, a power output shaft disposed with its axis at an angle to the main shaft and having a power take-off extending in the direction of the power input, a bevelled gear rotatably mounted on said countershaft, a bevelled gear secured upon the power output shaft and meshing with the first bevelled gear, and means for driving the first bevelled gear from said main shaft, said means for driving the bevelled gear comprising a gear secured on said main shaft, and a gear rotatable on the countershaft and meshing with the main shaft gear, the gear on said countershaft being secured to the bevelled gear on the countershaft.

4. In a change speed transmission, a power input member, a main shaft co-axial with said input member, a countershaft geared to said input member, selectively operable intermeshing members on said main and countershafts for driving said main shaft from the countershaft at different speeds, a power output shaft disposed with its axis at an angle to the main shaft and having a power take-off extending in the direction of the power input, a power take-off on said main shaft, and means connecting the main shaft and power output shaft whereby the two power take-offs rotate at like speeds in like directions, said last named means comprising a bevelled gear rotatably mounted on the countershaft and meshing with a bevelled gear on the power output shaft, and means for constantly driving the countershaft bevelled from the main shaft.

5. In a change speed transmission, a housing, a power input member rotatably journalled in one end of said housing, a main shaft rotatably journalled co-axial with the power input member and with one end exposed through the other end of the housing, a countershaft rotatably journalled in said housing, means for driving the countershaft from the power input member, members on said main and countershafts respectively adapted to be selectively intermeshed to drive the main shaft from the countershaft at different speeds, a third shaft rotatably journalled in said housing with an end exposed through the housing in the direction of the power input member, a gear on said main shaft, a gear on said third shaft, and a pair of connected gears rotatably supported by the countershaft and meshing with the gears on the main and third shafts respectively.

6. A transmission as defined in claim 5 having a bearing in the power input member supporting the adjacent end of the main shaft and maintaining it in co-axial alignment with the input member.

7. A transmission as defined in claim 5 wherein the third shaft is disposed at an angle to the main shaft, and the meshing gears on the countershaft and third shaft are bevelled gears.

8. In a change speed transmission, a housing, a power input member rotatably journalled in one end of said housing, a main shaft rotatably journalled co-axial with the power input member and with one end exposed through the other end of the housing, a countershaft rotatably journalled in said housing, means for driving the countershaft from the power input member, members on said main and countershafts respectively adapted to be selectively intermeshed to drive the main shaft from the countershaft at different speeds, a third shaft rotatably journalled in said housing with an end exposed through the housing in the direction of the power input member, a gear having an elongate bearing portion supported upon said countershaft by anti-friction bearings, a second gear connected to said gear to rotate therewith, and gears on the main and third shafts individually meshing with the gears on the countershaft.

9. In a change speed transmission, a housing, a power input member rotatably journalled in one end of said housing, a main shaft rotatably journalled co-axial with the power input member and with one end exposed through the other end of the housing, a countershaft rotatably journalled in said housing, means for driving the countershaft from the power input member, members on said main and countershafts, respectively adapted to be selectively intermeshed to drive the main shaft from the countershaft at different speeds, a third shaft rotatably journalled in said housing with an end exposed through the housing in the direction of the power input member, a bevelled gear having an elongate bearing portion supported upon said countershaft by anti-friction bearings, said third shaft being mounted at an angle with respect to the axis of the countershafts, a bevelled gear on said third shaft meshing with said bevelled gear, a gear connected to said bevelled gear, and a gear connected to the main shaft and meshing with the last named gear.

CECIL BUCHNER.